No. 764,873. Patented July 12, 1904.

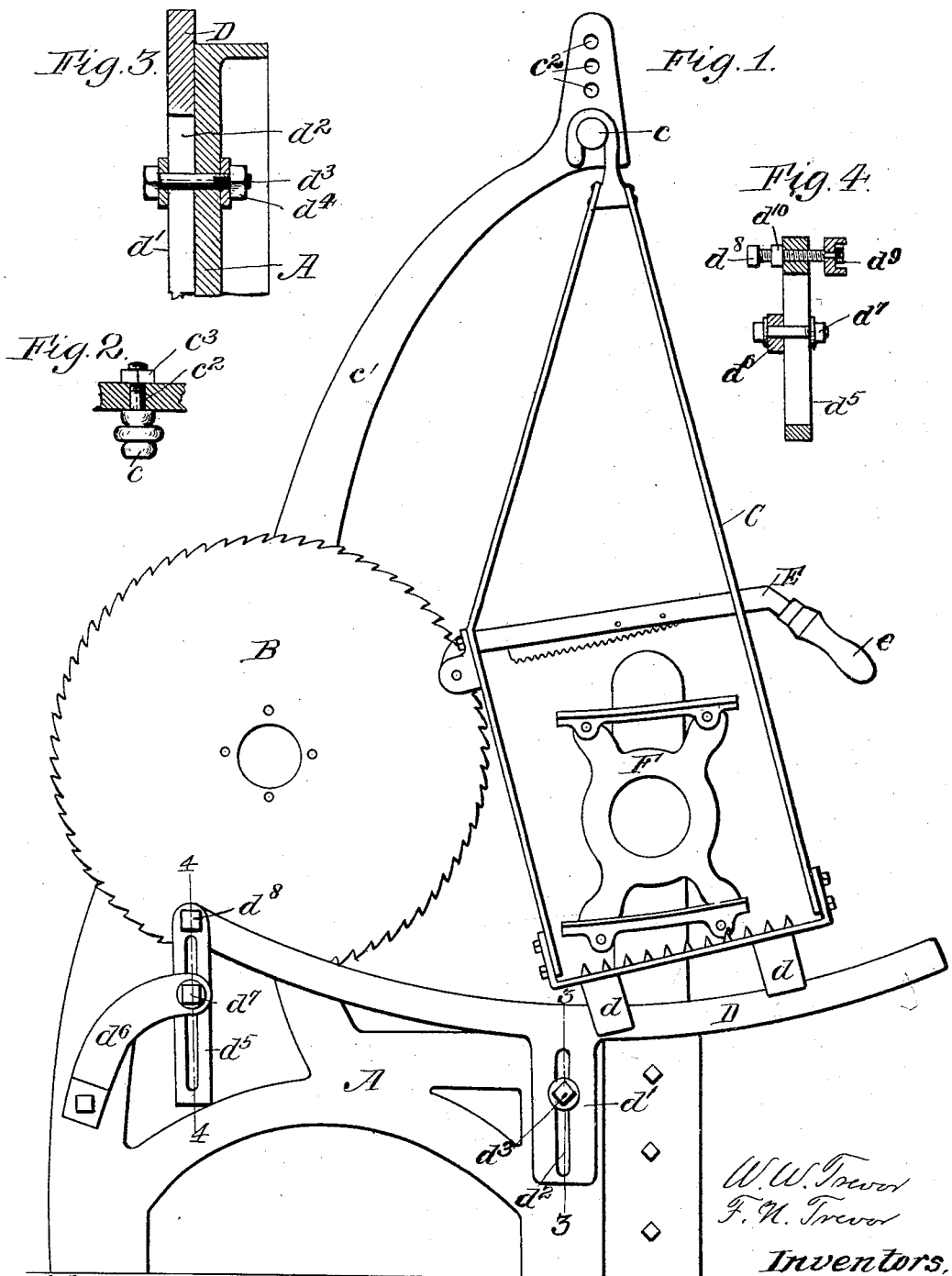

UNITED STATES PATENT OFFICE.

WILLIAM W. TREVOR AND FRANCIS N. TREVOR, OF LOCKPORT, NEW YORK, ASSIGNORS TO TREVOR MANUFACTURING COMPANY, OF LOCKPORT, NEW YORK.

SAWING-MACHINE.

SPECIFICATION forming part of Letters Patent No. 764,873, dated July 12, 1904.

Application filed June 1, 1903. Serial No. 159,549. (No model.)

*To all whom it may concern:*

Be it known that we, WILLIAM W. TREVOR and FRANCIS N. TREVOR, citizens of the United States, and residents of Lockport, in the county of Niagara and State of New York, have invented new and useful Improvements in Sawing-Machines, of which the following is a specification.

This invention relates to that well-known class of sawing-machines which embody a circular saw, a pendulous bolt-carriage which is provided with means for holding the bolt and which is swung to and fro by the operator for carrying the bolt against the saw and back, and a stationary bolt-gage which is arranged at one side of the bolt-carriage and against which the bolt is pressed by the operator before each movement of the carriage toward the saw to correctly gage the cut. In the operation of these sawing-machines, which are used largely for cutting barrel-headings, shingles, &c., the bolt is moved to the saw in a curved path concentric with the pivotal support for the bolt-carriage, and to secure the most efficient action of the machine the bolt should be supported by the carriage at such an elevation that the bolt strikes the saw first at the upper front edge of the bolt without, however, leaning so much toward the saw that the teeth of the latter will draw the bolt against the saw, because in the latter case the saw is liable to be broken unless the bolt splits under the action of the saw. Furthermore, the bolt should be supported at such a height that the mid-height of the back portion of the bolt moves in an arc passing through the axis of the saw, for in such a case the teeth of the saw will pass out of the bolt at about the middle of its rear side, and the saw will cut most nearly with the grain, and the cut from the front to the rear side of the bolt will have the least width, whereby less power is expended and the cut is completed by the shortest possible movement of the bolt. Heretofore no provision has been made in sawing-machines of this class for maintaining this desirable relation of the bolt to the saw when operating upon bolts which were shorter than the standard length, and consequently short bolts are cut on such machines at an improper elevation and in an undesirable manner. When cutting very short bolts, an auxiliary grate or bottom has been placed upon the grate at the bottom of the carriage for supporting the short bolt; but this means for overcoming the difficulty is objectionable for several reasons, among them that the radius of the arc in which the bolt swings is thereby shortened and the operator is compelled to lift the carriage and bolt higher in order to clear the saw, thus increasing his labor. Furthermore, such an auxiliary support increases the weight of the carriage, cumbers the carriage with a part which is liable to be disarranged or broken by dropping the bolts on the same, and provides for only one change in elevation.

The object of this invention is to render the pendulous bolt-carriage and its guide vertically adjustable to raise or lower the level of oscillation as the length of the bolt may require.

In the accompanying drawings, Figure 1 is a side elevation of a sawing-machine embodying the invention. Fig. 2 is a detail section showing the adjustable pivotal support for the bolt-carriage. Fig. 3 is a section in line 3 3, Fig. 1, showing the adjusting means for the guide. Fig. 4 is a vertical section in line 4 4, Fig. 1, showing the support for the rear end of the segmental guide.

Like letters of reference refer to like parts in the several figures.

A represents the stationary main frame of the machine; B, the upright circular saw, which is mounted on a horizontal shaft or arbor journaled in bearings on the main frame, and C the pendulous bolt-carriage, which is hung from a pivotal support $c$, secured to the upper portion of an arm $c'$, rising from the main frame. The lower portion of the bolt-carriage is provided with steadying lugs or projections $d$, which engage a segmental guide D, secured to the main frame and curved substantially concentric with the pivotal support for the bolt-carriage. The lower portion of the bolt-carriage has the form of an open frame, in which the bolt to be sawed is held between the bottom of the carriage and a holding-lever E, pivoted to the carriage. This lever is provided with a handle $e$, which is taken hold of by the operator for holding the bolt in the carriage and swinging the latter toward and from the saw.

F represents the usual stationary bolt-gage, against which the bolt is pressed by the operator before each cutting movement of the carriage to gage the cut.

$c$ represents the pivotal support for the bolt-carriage, which is adjustable vertically on the frame-arm $c'$ in any suitable manner. For instance, as shown, the latter may be provided with an upright upper end portion having a vertical series of holes $c^2$, in either of which the shank of the pivotal support $c$ is secured by a clamp-nut $c^3$.

The segmental guide D for the lower end of the bolt-carriage is adjustably secured to the frame in such manner that it can be bodily raised or lowered to correspond with the bolt-carriage, so that the steadying-lugs on the latter will properly engage the guide. In the construction shown the segmental guide is provided with a depending securing portion $d'$, which is located beside a vertical portion of the main frame and provided with a vertical slot $d^2$, through which and a hole in the main frame passes a securing-bolt $d^3$, provided with a clamping-nut $d^4$. $d^5$, Figs. 1 and 4, is an upright supporting-bar for the rear end of the segmental guide. The bar is secured to a bracket $d^6$ on the main frame by a bolt $d^7$, which passes through a hole in the bracket and a vertical slot in the upright bar and is provided with a clamping-nut. $d^8$ represents an adjusting-screw which passes through a threaded hole in the upper end of the upright bar $d^5$ and is swiveled to the rear end of the segmental guide. The inner end of the adjusting screw is preferably reduced and passes through a hole in the segmental guide, in which it is held by a countersunk nut $d^9$.

$d^{10}$ is a clamping-nut for holding the adjusting-screw when set.

The described manner of securing the segmental guide permits the latter to be adjusted bodily up or down to correspond with the bolt-carriage, and the adjusting-screw $d^7$ also provides for adjusting the segmental guide laterally or toward and from the flat side of the saw to secure the proper clearance for the saw.

The carriage and its guide may be said to be adjustable in the direction of a line which is drawn in front of the working side of the saw through the axis of oscillation and tangentially to a circle concentric with the saw. By raising or lowering the fulcrum of the pendulous carriage the elevation or level of the arc in which the bolt swings toward and from the saw is correspondingly raised or lowered, and this enables the elevation or level of oscillation to be adjusted with reference to the length of the bolt in such manner that an arc laid through the axis of the saw-arbor will pass approximately through the mid-height of the bolt at the back thereof, whether the bolt is long or short, although the variation from the standard length may be considerable—in some cases as much as ten inches. By so adjusting the elevation or level of the oscillation the proper cut is produced without changing the radius of the arc in which the bolt swings. The segmental guide is bodily raised or lowered correspondingly, thereby maintaining the proper relation of the guide to the carriage.

We claim as our invention—

1. The combination of a circular saw, an oscillatory bolt-carriage arranged to swing toward and from the saw, and means for adjusting the axis of oscillation of the carriage in the direction of a line drawn in front of the working side of the saw through the axis of oscillation and tangentially to a circle concentric with the saw, substantially as set forth.

2. The combination of a vertical circular saw, a pendulous bolt-carriage arranged in front of the saw and having its axis of oscillation above the same, and means for raising or lowering said axis, whereby the level or elevation of the oscillation of the carriage is correspondingly raised or lowered, substantially as set forth.

3. The combination of a circular saw, an oscillatory bolt-carriage arranged to swing toward and from the saw, means for adjusting the axis of oscillation of the carriage in the direction of a line drawn in front of the working side of the saw through the axis of oscillation and tangentially to a circle concentric with the saw, a segmental guide for the free end of the carriage, and means for adjusting said guide bodily to correspond with the adjustment of the axis of oscillation, substantially as set forth.

4. The combination of a vertical circular saw, a pendulous bolt-carriage arranged in front of the saw and having its axis of oscillation above the same, means for raising or lowering said axis, whereby the level or elevation of the oscillation of the carriage is correspondingly raised or lowered, a segmental guide for the lower end of the carriage, and means for raising or lowering said guide at both ends to correspond with the adjustment of the carriage, substantially as set forth.

5. The combination of a frame having an upwardly-extending arm provided at its upper end with a vertical series of holes, a vertical circular saw, a pendulous bolt-carriage, a pivotal support on which said pendulous carriage swings toward and from said saw, means for securing said support in either of said holes in the frame-arm to raise and lower said bolt-carriage, a curved guide for the lower end of said carriage, and means for adjusting both ends of said guide up or down, substantially as set forth.

6. The combination of a frame, a circular saw, a pendulous bolt-carriage, means for adjusting the axis of oscillation vertically, a guide for the bolt-carriage, means for adjusting said guide vertically, and means for adjusting said guide toward and from the flat side of the saw, substantially as set forth.

7. The combination of a frame, a circular saw, a pendulous bolt-carriage, means for adjusting the axis of oscillation vertically, a guide for said bolt-carriage, a vertically-adjustable supporting-bar for said guide, and a horizontal screw connecting said guide with said supporting-bar for adjusting the guide toward and from the flat side of the saw, substantially as set forth.

Witness our hands this 27th day of May, 1903.

WILLIAM W. TREVOR.
FRANCIS N. TREVOR.

Witnesses:
  M. L. WEBSTER,
  H. F. CUSHMAN.